Nov. 3, 1936.  R. D. SMITH  2,059,975

AUTOMATIC WHEEL ALIGNER

Filed Jan. 2, 1936

ROY D. SMITH INVENTOR.

BY *Merrill M. Blackburn*
ATTORNEY

Patented Nov. 3, 1936

2,059,975

UNITED STATES PATENT OFFICE 2,059,975

AUTOMATIC WHEEL ALIGNER

Roy D. Smith, Davenport, Iowa, assignor to Bee Line Manufacturing Company, Davenport, Iowa, a corporation of Iowa Application January 2, 1936, Serial No. 57,322

5 Claims. (Cl. 280—95)

The present invention relates to an improvement in motor vehicle construction and more particularly to the tie-rod assembly of the steering mechanism. Among the objects of this invention are to provide an apparatus which will function automatically to maintain a proper relationship between the steering wheels of a moving motor vehicle; to provide an apparatus of the character indicated which will function normally to cause proper coordination of the steering wheels during the act of steering and will yet permit relative motion thereof as necessitated by varying conditions of speed, road surface, etc.; to so modify the steering mechanism of motor vehicles of the character indicated that the steering wheels of the vehicle will always assume proper relative positions with relation to each other to reduce to a minimum the wear upon the tires of the vehicle; to so construct the steering mechanism of the vehicle that wheel shimmy will be eliminated; to so construct the steering mechanism of a motor vehicle that errors of wheel camber, axle caster, angle of steering arms, etc. will be automatically neutralized and that the vehicle will function properly regardless of such errors; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof,

Figure 1:
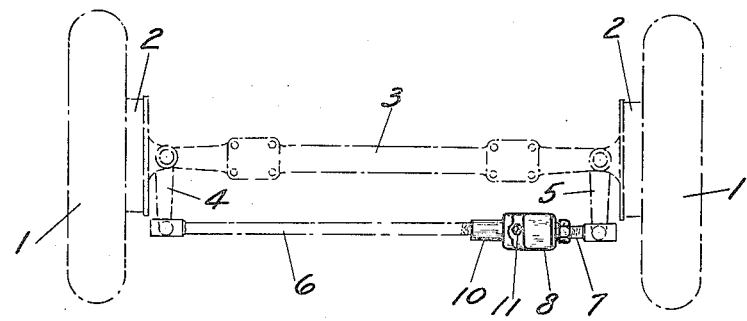
Fig. 1 shows a plan view of my present construction, inserted in the steering mechanism of a motor vehicle, the wheels and axle and parts of the steering mechanism being shown in dotted lines.

Reference will now be made in greater detail to the annexed drawing for a more complete disclosure of this invention. The tires are denoted by the numeral 1, the brake drum by the numeral 2, and the axle by the numeral 3. Crank arms are illustrated at 4 and 5 but no effort has been made to have these shown accurately as they are merely for the purpose of illustration. It will be understood that these crank arms are rigidly connected to the spindles to cause turning of the wheels, as is customary. The end sections 6 and 7 of the tie-rod are indirectly connected to the crank arms 4 and 5, and the means which connects these end sections constitutes the subject-matter of my present invention. This connecting means is denoted in general by the numeral 8.

The connecting means comprises a hollow body 9 provided at one end with a boss 10 which is screw-threadedly connected to the tie-rod section 6. An opening into the upper part of the body 9 is closed by a plug 11 which may be removed for the filling of the internal concavity of the body with a suitable fluid, preferably a heavy oil which is affected very little by temperature changes. The shell or body 9 is provided, adjacent its ends, with cylindrical seats which are preferably of identically the same internal diameter, although it is possible to have one of them of greater diameter than the other and still have an operative construction. The fabrication and assembly are easier and cheaper if these seats 12 and 13 are made identical in internal diameter.

An internal body 14 has a hollow cylindrical end 15 through which passes an opening 16 to connect the concavity 17 of the body 9 with the concavity 18 of the body 15. The external surface of the body 15 is cylindrical and of such a size that it is necessary to heat the body 9 before the inner extremity of the body 15 may pass within the cylindrical seat 12. When the parts are assembled in this way and then allowed to cool down, there will be a non-separable and leak-proof connection between the parts 9 and 15. The body 14 is provided with a part 19 having a cylindrical seat 20 which fits the seat 13 in exactly the same way that the inner end of the cylindrical body 15 fits the seat 12. As indicated above, the seat 13 may be the same in diameter as the seat 12 or may be slightly larger so as to permit the part 15 to slide therethrough easily. Whatever the diameters of the seats 12 and 13, the fit of the parts must be such that they will be non-separable under ordinary driving stresses.

Figure 2:
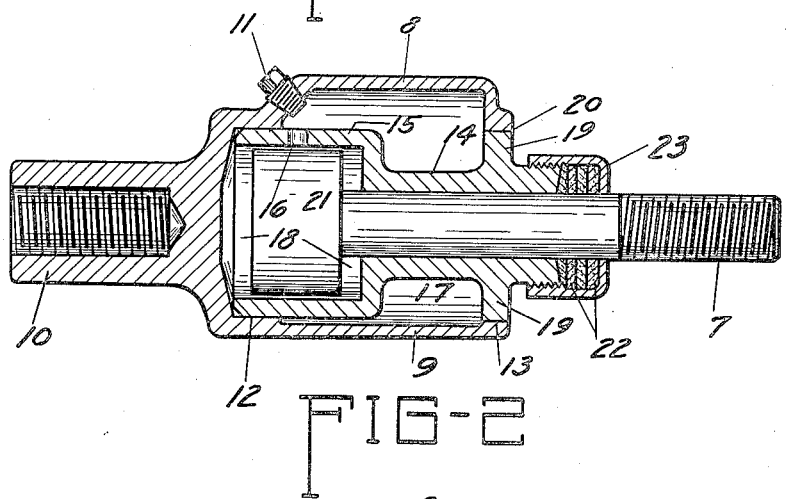
Fig. 2 represents a vertical longitudinal section of a construction embodying my present invention.
Figure 3:
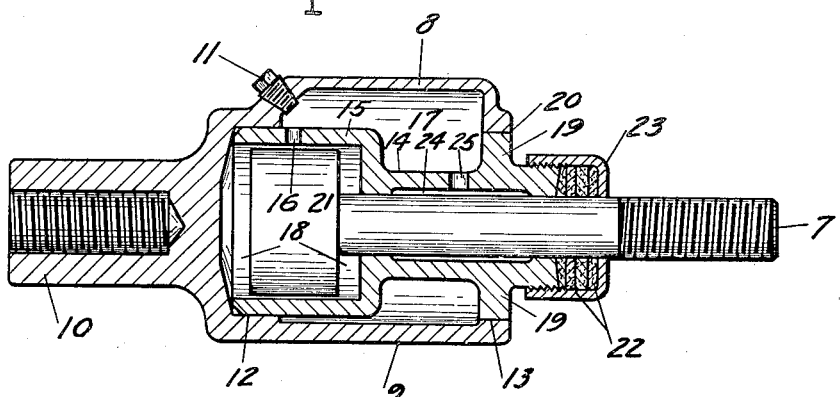
Fig. 3 represents a structure, in longitudinal section, similar to the structure shown in Fig. 2, this structure being a slight modification of that illustrated in Fig. 2.

An opening is formed longitudinally of the body 14 and is preferably coaxial with the internal concavity in the body 15. A piston 21 is slidable in the concavity 18 but the clearance between this piston and the walls of the cavity is not as great as illustrated in Figs. 2 and 3 of the drawing, this clearance being shown somewhat exaggerated in order to illustrate that it is possible for the oil to flow from the cavity 18 through the opening 16 and into the cavity 17. It is evident that as the piston 21 reciprocates in the chamber 18 it will be necessary for a certain amount of oil to pass through the opening 16, since, as the piston 21 moves to the left, as shown in Fig. 2, not all of the oil can be accommodated upon the opposite side of the piston on account of the presence of the stem 7 which is connected to the piston. This stem 7, as clearly illustrated, extends through the opening in the body 14 and is slidable therein. Packing material 22 surrounds the stem 7 and is compressed against same and against the end of body 14 by means of the cap or gland 23.

The structure shown in Fig. 3 differs from that shown in Fig. 2 in that it has a recess 24 surrounding the stem 7 and an opening 25 connecting this recess 24 with the cavity 17. This reduces the friction of the stem 7 with the body 14. However, it is not thought that this refinement is necessary as there is not a great deal of relative motion between the parts 7 and 14, and what motion there is is slow.

It is apparent from the foregoing that the two wheels, during normal steering of the vehicle, will move together but that they are capable of independent motion when such is necessitated by the striking of obstructions or due to other causes. For example, the character and shape of the road surface may necessitate a certain amount of relative movement between the two wheels. This is permitted by the apparatus which gives a certain amount of flexibility between the wheels, which is not permitted by the ordinary rigid construction. Another occasion for relative movement between the wheels is when making a right or left hand turn. This structure permits relative shifting between the wheels so that neither one will tend to cause the other one to slip sidewise.

It is obvious that, in running straight ahead, the tires should have their central planes parallel. It is a well known fact that when making a turn the central planes of the wheels cannot be parallel because the wheel on the inside of the turn must have a shorter turning radius than the other wheel in order that the two may turn about the same center. Therefore, one must make an angle with respect to the other, and the shorter the turning radius the greater will be this angle. When this device is used in the tie-rod, it permits the wheels to be self-adjusting so that there will be no side-slippage of one with relation to the other.

It is obvious from the foregoing that the wheels will be permitted to have a certain freedom of motion with relation to each other but that the rate of motion will be slow, owing to the necessity for the fluid to pass through a small opening or openings in order that there may be this relative movement. At any rate, the use of this device will reduce the amount of tire wear due to side-slipping of one or both tires.

Besides reducing tire wear, this device provides semi-automatic steering control and minimizes the danger of accident from tire blow-out or mechanical failure due to broken parts, such as king pins, springs, or wheel bearings. Road tests have proven that the toe-in of the front wheels should be considerably different for different road conditions, for different air pressures, and for the varying speeds at which motor vehicles are driven. If given an opportunity to do so, the front wheels will automatically align perfectly and in accordance with the conditions which are constantly changing as the car is being driven.

It has been proven by actual road tests that if an automobile is equipped with this invention and there is a sudden tire failure due to a blow-out, there will be automatic and almost immediate accommodation for the changed condition of tire inflation and the driver will be enabled to maintain control of the car as easily as if all the tires were properly inflated. Also, since the front wheels are self-adjusting for running alignment conditions, there can be no shimmy or road shock in the steering system as it is agreed by automotive engineers that no car will develop an oscillating shimmy movement if the wheels are in perfect alignment.

It will of course be understood that the specific description of structure set forth above may be departed from without departing from the spirit of my invention as set forth in this specification and the appended claims.

Having now described my invention, I claim:

1. A structure for the purpose indicated comprising a tie-rod assembly for connecting the crank arms of the steering mechanism of a motor vehicle, said assembly comprising a rod having yielding means connecting two separated parts thereof, said yielding means comprising a container for a substantially incompressible fluid, a compartment within said container and occupying a part of the space thereof, and a piston within said compartment, said piston being connected to one of the end portions of the tie-rod and being slidable longitudinally of the container as the two sections of the tie-rod move longitudinally with respect to each other.

2. A tie-rod assembly for a motor vehicle comprising a two-piece rod, the pieces of which are connected by yielding means, said yielding means comprising a container for substantially non-compressible fluid, a second container within the first-named container and occupying a part of the space therein, said second container being connected adjacent its ends to the first container in fluid-tight relation, a piston within the second container and slidable therein, the second piece of the tie-rod being connected to said piston to slide therewith relatively to the first piece of the tie-rod, there being a restricted opening connecting the first and second containers to permit passage of fluid from one to the other as the piston reciprocates.

3. Yielding means to constitute a part of the tie-rod assembly of a motor vehicle, said yielding means comprising a container to be connected to an end of one section of the plural-piece tie-rod, said container having an opening through one end wall thereof, a second container slidable through said opening and having a part to tightly engage the surrounding wall of the opening to form therewith a fluid-tight connection for the two parts, the inner end of the second container fitting tightly a cooperating wall of the first container to form therewith a fluid-tight joint, the second container having a second section of the tie-rod mounted and slidable therethrough, and a piston on the inner end of said second section of the tie-rod, said piston cooperating with the surrounding wall of the second container to form therewith a dashpot for controlling the relative reciprocation of the sections of the tie-rod.

4. A yieldable unit for use as an element of a motor vehicle tie-rod comprising a container having screw-threaded means at one end for connection to a tie-rod section, said container having at its end adjacent the screw-threaded means an internal socket having a cylindrical wall which serves as a seat for a second container, said first container having in its opposite end an opening serving as a seat for a second part of the second container, a second container having external walls fitting tightly the cooperating walls of the first container, said second container having a longitudinal opening extending completely therethrough and another opening extending from said opening to the inside of the first container, and a piston slidable longitudinally within the second container and having a stem extending through the opening in the second container from the piston to the exterior of the yieldable means for connection to a part of the steering apparatus of the motor vehicle.

5. A structure as defined by claim 4 having its interior nearly filled with a substantially non-compressible fluid.

ROY D. SMITH.